United States Patent
Michenfelder et al.

[11] Patent Number: 6,150,783
[45] Date of Patent: Nov. 21, 2000

[54] DEVICE AND METHOD FOR A WIPING SYSTEM

[75] Inventors: Gebhard Michenfelder, Iffezheim; Michael May, Offenburg, both of Germany

[73] Assignee: Robert Bosch GmbH, Stuttgart, Germany

[21] Appl. No.: 09/341,059

[22] PCT Filed: Dec. 16, 1997

[86] PCT No.: PCT/DE97/02920

§ 371 Date: Jul. 2, 1999

§ 102(e) Date: Jul. 2, 1999

[87] PCT Pub. No.: WO98/30422

PCT Pub. Date: Jul. 16, 1998

[30] Foreign Application Priority Data

Jan. 9, 1997 [DE] Germany .......... 197 00 457

[51] Int. Cl.[7] .......... H02P 1/04
[52] U.S. Cl. .......... 318/443; 318/DIG. 2; 318/444; 15/250.13; 15/250 C
[58] Field of Search .......... 318/443, DIG. 2, 318/444; 15/250.13, 250 C

[56] References Cited

U.S. PATENT DOCUMENTS 4,544,870 10/1985 Kearns et al. .......... 318/444
5,860,185 1/1999 Ponziani .......... 318/443

FOREIGN PATENT DOCUMENTS 32 08 121 A1 9/1983 Germany .

OTHER PUBLICATIONS

U. Tietze, Ch. Schenk, Halbleiterschaltungstechnik, 5. Auflage, pp. 689–714.

*Primary Examiner*—Karen Masih
*Attorney, Agent, or Firm*—Michael J. Striker

[57] ABSTRACT

A regulated windshield wiper device (10), in particular for motor vehicles, is proposed, which predetermines a corrected guidance variable (F) by determining a correction variable (K) so that the regulating deviation of the control circuit becomes approximately zero. In order to regulate the position (X) of at least one wiper (16) that oscillates between two end positions (18.1, 18.2, 18.3), the windshield wiper device (10) includes an electronically reversible drive motor (14) and a regulating unit (12), which compares a regulation variable (R) to a guidance variable (F) and regulates the motor (14) by means of a control variable (S), wherein the deviation between the guidance variable (F) and the regulation variable (R) and/or other parameters, e.g. the control variable (S) or variables derived from the regulation variable (R), is used to calculate a correction variable (K) with which the guidance variable (F) can be corrected.

14 Claims, 1 Drawing Sheet

DEVICE AND METHOD FOR A WIPING SYSTEM

BACKGROUND OF THE INVENTION

Prior Art

The invention is based on a windshield wiper device. A device and a process for a regulated windshield wiper device for vehicles is already known (German Patent Disclosure 32 08 121 A1). The control circuit in that instance has a position regulator that sends a control variable to the motor circuit and is supplied on the one hand with the rotational position of the motor drive shaft as a regulation variable and on the other hand, is supplied with a presettable desired course of the wiper movement as a time-dependent guidance variable.

Generally, the regulator influences the regulation variable with the aid of the control variable so that the regulating deviation (guidance variable minus regulation variable) is as small as possible. The regulating deviation in a dynamic, time-dependent regulation, however, cannot be arbitrarily reduced e.g. by increasing the control circuit amplification, since the change of the control variable and the effect on the regulation variable are time-delayed and the consequently inevitable phase shifts in the control circuit would lead to oscillations (U. Tietze, Ch. Schenk, Halbleiterschaltungstechnik [Semi-Conductor Switching Technology] $5^{th}$ edition, p. 688 ff).

Frequently, more powerful motors, faster computers, etc. in a control circuit are ruled out due to the cost reduction desired by the vehicle manufacturer. This in turn likewise leads to a greater regulation deviation.

SUMMARY OF THE INVENTION

The device according to the invention and the process according to the invention for a windshield wiper assembly, has the advantage that the regulation deviation is compensated for. A correction variable is determined, which corresponds to the regulation deviation and corrects the guidance variable precisely so that the difference between the uncorrected guidance variable and the regulation variable that follows it becomes approximately zero.

It is particularly advantageous that the correction variable is to be determined from the deviation between only at least two variables, namely from the regulation variable and the guidance variable, and that other parameters, such as the control variable, or variables derived from the above-mentioned variables, can be used to determine the correction variable.

It is furthermore particularly advantageous that the wiping region is divided into two regions. If the wiper leaves one of its two end positions or reversal positions, then in the first region wiped through, a correction variable is determined by means of the measured and stored values of the regulation variable and the control variable. The guidance variable in the subsequent second region is corrected with this correction variable so that the wiper reaches its other provided end position or reversal position by taking into account external influences or interference variables.

It is furthermore advantageous that the system elasticities of the wiper assembly are included in the guidance variable by taking into account the wiper speed and the rigidity of the wiper assembly so that the wiping region is independent of the elasticities and is therefore always identical.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 shows a regulated windshield wiper device for a windshield wiper assembly, FIG. 2 shows a graph of the wiper position as a function of time.

DESCRIPTION OF THE PREFERRED EMBODIMENT

Figure 1:
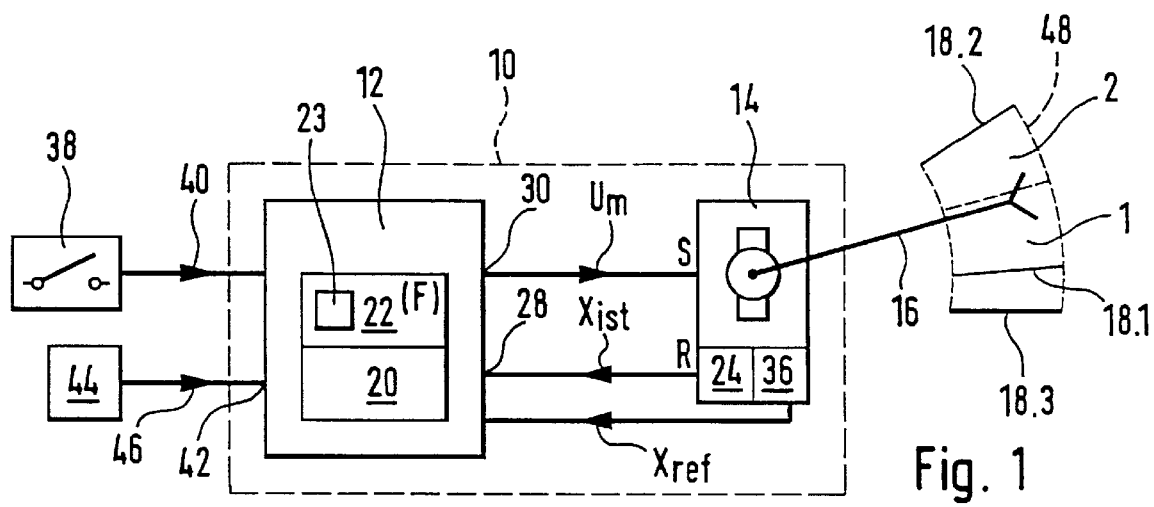

The windshield wiper device 10 has a regulating unit 12 and a motor 14 that is regulated by the regulating unit 12. The electronically reversible motor 14 drives a wiper 16 by way of a linkage, not shown, so that the wiper 16 oscillates back and forth between two end positions 18.1 and 18.2 or is moved into the other end position 18.3. The regulating unit 12 has a counter 20 and an evaluation unit 22 with a timer 23 for presetting a wiping cycle time. On a suitable location of the motor 14, for example the armature shaft or the drive shaft, means for detecting its position 24 are disposed, which supply position actual values Xist as a regulation variable R to the counter 20 by way of a first actual signal input 28 of the regulating unit 12. A motor voltage signal Um is sent to the motor 14 by way of a signal output 30 of the regulating unit 12 in order to operate this motor in a regulated manner in the desired operating mode.

An end position sensor 36 on the motor 14 supplies a reference signal Xref to the counter 20 each time the wiper 16 reaches the end position, reversal position, or parking position monitored by the end position sensor 36.

An operating element 38 for the wiper assembly, which can be manually actuated by the driver, supplies operating mode signals 40 to the regulating unit 12. For example, these operating mode signals control different speed and/or interval settings of the wiper 16.

By way of another signal input 42, the regulating unit 12 can be supplied with another input signal 46 produced by a rain sensor 44, e.g. for wiping intervals or for wiper speeds.

The wiping region 48 wiped over by the wiper 16, indicated with dashed lines, is divided into two regions 1 and 2.

Figure 2:
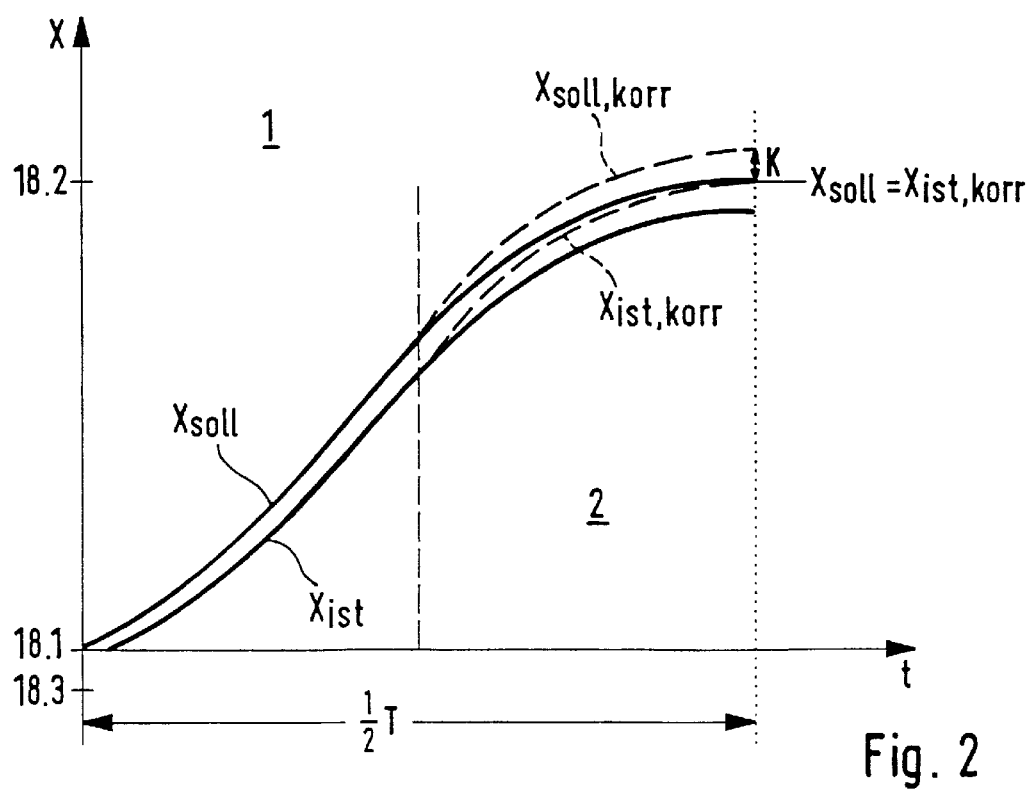

FIG. 2 is a graph of the position X of the windshield wiper on the vehicle windshield as a function of time t. The two end positions 18.1 and 18.2 are plotted on the position axis X. Half the wiping cycle duration ½T is plotted on the time axis t, which corresponds to the movement of the wiper 16 from the first end position 18.1 to the second end position 18.2.

The curves represent the position X of the wiper 16 at a particular time t. The upper of the two solid curves corresponds to the position set value curve Xsoll, that the wiper 16 describes in the ideal case. At time t=0, the curve begins exactly in the end position 18.1 and ends at time t=½T exactly in the end position 18.2. The lower solid curve represents the actual course of the position actual values Xist over time t.

The graph is divided into two regions. The first region 1, according to FIG. 1, corresponds to the region 1 that the wiper 16 first travels through after leaving an end position 18.1, the second region 2 corresponds to the subsequent region it travels through in FIG. 1. Dashed curves are indicated in the second region 2; the upper curve corresponds to the corrected position set value curve Xsoll,korr and the lower curve corresponds to the resultant corrected position actual value curve Xist,korr. The correction variable K corresponds to the difference between the position set value Xsoll and the corrected position set value Xsoll,korr at time t=½T, which is determined by the regulating unit 12 for each wiper pass.

The operation of the novel windshield wiper device according to FIG. 1 will now be described in conjunction with FIG. 2:

In order to regulate the wiper position X, position set values Xsoll are stored in the regulating unit 12 as guidance variables F in an evaluation unit 22 that is designed as a micro-controller. The guidance variable F changes with time t, as shown in FIG. 2 by the upper solid line Xsoll. In order to realize the position set values Xsoll, the motor 14 is controlled with a respective time-dependent voltage Um and the wiper 16 is moved back and forth between the end positions 18.1, 18.2 of the wiping region 48.

In the meantime, position actual values Xist are scanned by position detection means 24. Pulses are generated for this, by means of two Hall sensors in connection with an annular magnet on the motor 14, preferably on the armature shaft of the motor 14. These pulses are supplied to a counter 20 in the regulating unit 12, which determines the actual position Xist of the wiper 16 from them. For example, the entire wiping region of approx. 90 degrees can be described by 200 pulses and the actual position Xist of the wiper 16 in the wiping region 48 can be precisely associated with an angle of approx. 0.5 degrees.

In order to adjust the counter 20, a reference signal Xref is supplied to the counter 20. This reference signal Xref is received by an end position sensor 36, which preferably detects an end position signal or a parking position signal of the wiper 16, for example by way of a contact disk or another Hall sensor. A zero point signal is supplied to the counter 20 by means of the reference signal Xref. An incremental value transmitter as a counter 20 is reset by the zero point signals.

The evaluation unit 22 now compares the position actual values Xist as a regulation variable R with the position set values Xsoll as a guidance variable F and with a deviation of the two variables R, F, regulates the voltage Um in the motor 14 as a control variable S.

The interference variables of the control circuit now result from the travel speed of the vehicle, the wind conditions on the windshield, or the moisture conditions on it. By means of vehicle speed or wind, additional forces act on the wiper 16, which lead to the fact that the actual position Xist differs more or less from the set position Xsoll. Likewise, the moisture on a windshield, not shown, influences the friction between the wiper blade of the wiper 16 and the windshield, and consequently influences the speed of the wiper 16 and its actual position Xist. In the position actual value curve Xist according to FIG. 2, there is, for example, a dry wiped area 48. The wiper 16 consequently has not reached the end position 18.2 after half a wiping cycle duration T, but has only reached a position before the end position 18.2.

The mechanical system elasticities of the wiper system, which likewise lead to a deviation from the desired end position, are compensated for by means of the programming of the regulation, e.g. by the vehicle manufacturer, by taking into account wiper speed and rigidity of the wiper assembly.

As already described at the beginning, with the selected system components of the motor 14 and regulating unit 12, variable regulating deviations occur in a dynamic regulation. The correction of this variable regulating deviation, more precisely stated, the difference between the set position Xsoll and the actual position Xist at time t=½T, is realized by means of the windshield wiper device according to the invention as follows:

The wiping region 48 is divided into two regions 1, 2, each of which constitutes half of the half-wiping cycle duration ½T. If the wiper 16 is now controlled by the regulating unit 12 in such a way that for example, it leaves the end position 18.1 and moves in the direction of its second end position 18.2, then by definition, it first wipes through the first region 1 of the wiping region 48.

In the first region 1, the time-dependent deviation between the guidance variable F and the regulation variable R is determined. As a further parameter for determining the correction variable K, motor speed values are derived from the regulation variable R, which are stored in the evaluation unit 22. Likewise, the control variable S is used as a further parameter with which the motor 14 is controlled in the first region 1. Both variables R, F and the additionally determined further parameters, as well as the elasticities of the wiper assembly that are known in principle, are evaluated in accordance with a regulation algorithm that can be predetermined, for example weighted or averaged and the like, and are used to determine a correction variable K. This correction variable K is selected in such a way that the position actual value curve Xist coincides with the uncorrected position set value curve Xsoll at least at time t=½T.

The correction variable K determined from the deviation in the first region 1 now results in the fact that the position set value curve Xsoll is corrected in the second region 2 so that now, not the solid line Xsoll, but the dashed line Xsoll,korr disposed above it used for regulating the wiper motor 14. Through the regulation in accordance with the corrected position set value curve Xsoll,korr as a new guidance variable F, the position actual values Xist are tracked so that the wiper movement corresponds to the dashed, corrected position actual value curve Xist,korr. The wiper 16 now travels toward the provided end position 18.2 taking into account the actual control circuit.

In the second half of the wiping cycle duration T, not shown, the wiper 16 leaves the end position 18.2 and returns to the end position 18.1. The correction of the position set value curve Xsoll now occurs in an equivalent fashion: The first region, in which correction variable K is determined, now comes directly after the time t=½T and lasts until the time t=¾T. In the subsequent second region from t=¾T to t=T, in turn, the correction of the position set value curve Xsoll is carried out in accordance with the process described above.

In alternative exemplary embodiments, the wiping region 48 can be divided into two regions 1, 2, which constitute for example one third and two thirds of the half-wiping cycle duration ½T etc. Likewise, in lieu of the time t, the position X can be used as a measure for the division of the wiping region 48 as well as for the correction variable K.

The exemplary embodiment furthermore provides an operating element 38 with which the driver of the motor vehicle can, for example, preset different speed and interval settings of the wiper 16. In response to the operating mode signals 40 that can be triggered by the operating element 38, the timer 23 presets the time-dependent guidance variable F at different wiping cycle durations T. In FIG. 2, with the selection of a faster or slower speed setting of the wiper 16, the time axis t is compressed or elongated (multiplication with a factor less than or greater than one) so that the position set values Xsoll travel the distance between the two end positions 18.1, 18.2 in a shorter or longer wiping cycle duration T.

The wiper operation can also be shut off with the aid of the operating element 38. For this, the wiper 14 is put away in the parking position or the other end position 18.3, which corresponds as a guidance variable F to another position set value curve Xsoll and is likewise stored in the evaluation unit 22.

In an improvement of the exemplary embodiment, a rain sensor 44 supplies additional input signals 46 to the regulating unit 12, which the regulating unit 12 associates with speed settings of the wiper 16 that are to be continuously adjusted. It is therefore possible to relate the guidance variable F with arbitrary wiping cycle durations T that can be continuously selected.

The presetting of two or more different time-dependent guidance variables f permits the synchronous operation of two or more wiper motors.

What is claimed is:

1. A windshield wiper device for motor vehicles, comprising at least one wiper that oscillates between two end positions; an electrically reversible drive motor; and a regulating unit which compares a regulation variable in form of position actual values of said motor, to a guidance variable in form of presettable position set values of said motor and therefore of said wiper, and regulates said motor by a control valuable in form of a motor voltage, said regulating unit producing at least one variable from a deviation of the guidance variable and the regulation variable and using the at least one variable to determine a correction; means for dividing a wiping region disposed between the end positions into two regions, said regulating unit using the correction as a correction variable that is determined in a first one of said regions and correcting the guidance variable in a subsequent, second one of said regions.

2. A windshield wiper device as defined in claim 1, wherein said regulating unit uses other parameters to determine the correction variable which other parameters include the control variable or variables derived from the regulation variable in form of motor speed values.

3. A windshield wiper device as defined in claim 1, wherein said regulating unit determines the correction variable in the first region in which said wiper is disposed after leaving one of the two end positions, and corrects the guidance variable in the second region by the correction variable.

4. A windshield wiper device as defined in claim 3 wherein the two regions divide the wiping region in half.

5. A windshield wiper device as defined in claim 3, wherein the two regions divide the wiping region into one third and two thirds.

6. A windshield wiper device as defined in claim 1; and further comprising an operating element supplying operating mode signals which are to be associated with at least one speed setting of said wiper by said regulating unit.

7. A windshield wiper device as defined in claim 6, wherein said operating element operates so that at each speed setting, different position set values as a function of time are preset as the guidance variable.

8. A windshield wiper device as defined in claim 1; and further comprising a rain sensor that supplies input signals corresponding to a moisture quantity detected by said rain sensor on a windshield in a wiping region of said wiper, said signals being associated with a wiping speed of said wiper by said regulating unit.

9. A windshield wiper device as defined in claim 1; and further comprising an end position sensor which supplies said regulating unit with a signal selected from the group consisting of an end position signal, a parking position signal and both, as a reference signal.

10. A windshield wiper device as defined in claim 1, wherein said regulating unit compares the regulation variable to the guidance variable, which guidance variable is changed as a function of time.

11. A process for regulating a position for a windshield wiper that oscillates between two end positions, for motor vehicles, with an electronically reversible drive unit and a regulating unit, the process comprising comparing by the regulating unit a regulation variable formed as position actual values of a motor, to a guidance variable formed as presettable position set values of the motor and therefore of the wiper; regulating by the regulating unit of the motor by means of a control variable which is formed as a motor voltage; dividing a wiping region disposed between the end positions into two regions; storing and/or weighing in an evaluation unit of the regulating unit in the first region the regulation variable or a variable derived from it and formed as motor speed values and/or the control variable formed as a motor voltage; determining a correction variable based on a deviation of the regulation variable from the guidance variable, together with the stored and/or weighted variables; using the correction variable in a subsequent second region to correct the guidance variable of a control circuit formed as position set values of the motor.

12. A process as defined in claim 11; and further comprising the step of determining the correction variable in the evaluation unit embodied as a micro-controller, in accordance with a regulating algorithm that is predeterminable.

13. A process as defined in claim 11; and further comprising the step of presetting the guidance variable by an operating mode signal of an operating element, by tying at least one speed setting of the wiper to at least one wiping cycle duration.

14. A process as defined in claim 11; and further comprising the step of presetting the guidance variable by an input signal of a rain sensor, by tying at least one speed setting of the wiper to at least one wiping cycle duration.

* * * * *